(12) United States Patent
Sugiyama et al.

(10) Patent No.: US 11,686,972 B2
(45) Date of Patent: *Jun. 27, 2023

(54) BACKLIGHT DEVICE

(71) Applicant: Japan Display Inc., Tokyo (JP)

(72) Inventors: Ken Sugiyama, Tokyo (JP); Kosuke Matsubara, Tokyo (JP); Takeshi Kaneki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,560

(22) Filed: Dec. 8, 2021

(65) Prior Publication Data

US 2022/0100034 A1 Mar. 31, 2022

Related U.S. Application Data

(63) Continuation of application No. 17/200,224, filed on Mar. 12, 2021, now Pat. No. 11,209,695, which is a
(Continued)

(30) Foreign Application Priority Data

Nov. 24, 2017 (JP) ................................. 2017-226210

(51) Int. Cl.
*G02F 1/13357* (2006.01)
*G02F 1/1362* (2006.01)
(Continued)

(52) U.S. Cl.
CPC ..... *G02F 1/133602* (2013.01); *G02B 6/0091* (2013.01); *G02B 6/0095* (2013.01); *G02F 1/133512* (2013.01); *G02F 1/136286* (2013.01)

(58) Field of Classification Search
CPC ......... G02F 1/133602; G02F 1/133512; G02F 1/136286; G02B 6/0091; G02B 6/0095
(Continued)

(56) References Cited

U.S. PATENT DOCUMENTS 10,948,768 B2 * 3/2021 Sugiyama ............ G02B 6/0095
11,209,695 B2 * 12/2021 Sugiyama ............ G02B 6/0091
(Continued)

FOREIGN PATENT DOCUMENTS

GB    2546678       7/2017
JP    10-247412     9/1998
(Continued)

OTHER PUBLICATIONS

Japanese Office Action dated May 25, 2021, in corresponding Japanese Application No. 2017-226210.

*Primary Examiner* — Edward J Glick
*Assistant Examiner* — William D Peterson
(74) *Attorney, Agent, or Firm* — K&L Gates LLP

(57) ABSTRACT

A backlight device is provided and includes case having bottom plate; light guide including front surface as emission surface, rear surface opposed to front surface, and incidence surface provided between front and rear surfaces, rear surface being arranged on bottom plate; and light-emitting elements facing incident surface of light guide, wherein light-emitting elements includes first surface provided at bottom of light-emitting elements, and light-emitting surface facing incidence surface of light guide, first surfaces and rear surface are arranged side by side, and fixed to fixing tape attached over first surfaces and rear surface of light guide, and light-shield is facing fixing tape through light guide.

16 Claims, 5 Drawing Sheets

Related U.S. Application Data continuation of application No. 16/196,428, filed on Nov. 20, 2018, now Pat. No. 10,948,768.

(51) Int. Cl.
*G02F 1/1335* (2006.01)
*F21V 8/00* (2006.01)

(58) Field of Classification Search
USPC .......................................................... 349/69
See application file for complete search history.

(56) References Cited

U.S. PATENT DOCUMENTS

| | | | | |
|---|---|---|---|---|
| 2010/0328580 | A1* | 12/2010 | Kim | G02B 6/0073 |
| | | | | 349/64 |
| 2015/0260909 | A1* | 9/2015 | Nambu | G02B 6/0091 |
| | | | | 362/613 |
| 2016/0306092 | A1 | 10/2016 | Yoshida | |
| 2016/0377799 | A1* | 12/2016 | Park | G02B 6/0085 |
| | | | | 349/65 |
| 2019/0094614 | A1 | 3/2019 | Edamitsu et al. | |

FOREIGN PATENT DOCUMENTS

| | | |
|---|---|---|
| JP | 2003-076287 | 3/2003 |
| JP | 2007-026859 | 2/2007 |
| JP | 2015-176680 A | 10/2015 |
| JP | 2016-207279 A | 12/2016 |
| JP | 2017-157467 | 9/2017 |

* cited by examiner

BACKLIGHT DEVICE

CROSS-REFERENCE TO RELATED APPLICATIONS

This application is a continuation of U.S. patent application Ser. No. 17/200,224, filed on Mar. 12, 2021, which is a continuation of U.S. patent application Ser. No. 16/196,428, filed on Nov. 20, 2018, now U.S. Pat. No. 10,948,768, issued on Mar. 16, 2021, which application is based upon and claims the benefit of priority from Japanese Patent Application No. 2017-226210, filed Nov. 24, 2017, the entire contents of which are incorporated herein by reference.

FIELD

Embodiments described herein relate generally to a backlight device and a liquid crystal display device comprising the same.

BACKGROUND

Liquid crystal display devices have been widely used as display devices of smartphones, tablet computers, vehicle-navigation systems and the like. In general, a liquid crystal display device comprises a liquid crystal panel and a backlight device which illuminates the liquid crystal panel. The backlight device comprises a frame (or bezel), a reflective layer, a light guide, an optical sheet (prism sheet or diffusing sheet), a light source device (light source unit) which supplies light made incident on the light guide and the like. The light source unit comprises a wiring board such as an FPC and a plurality of light sources (for example, light-emitting diodes (LEDs)) mounted on the wiring board.

To narrow the frame of the liquid crystal display device, the width of the frame is reduced mainly along the right side and the left side. Recently, there has been increasing demand for large reduction of the width on the light source side (light entering side).

SUMMARY

The present application relates generally to a backlight device and a liquid crystal display device including the same.

According to one embodiment, a backlight device includes a case having a bottom plate, a light guide having an emission surface, a second main surface and an incidence surface and arranged on the bottom surface, and a light source unit including a wiring board and light-emitting elements on the wiring board. Each light-emitting element has a mounting surface, a first side surface opposed to the mounting surface, and a light-emitting surface between the mounting surface and the first side surface. Each light-emitting surface faces the incidence surface, and the first side surfaces are arranged parallel to the second main surface, and the light source unit is fixed to the light guide with a fixing tape attached over each first side surface and the second main surface.

DETAILED DESCRIPTION

Figure 1:
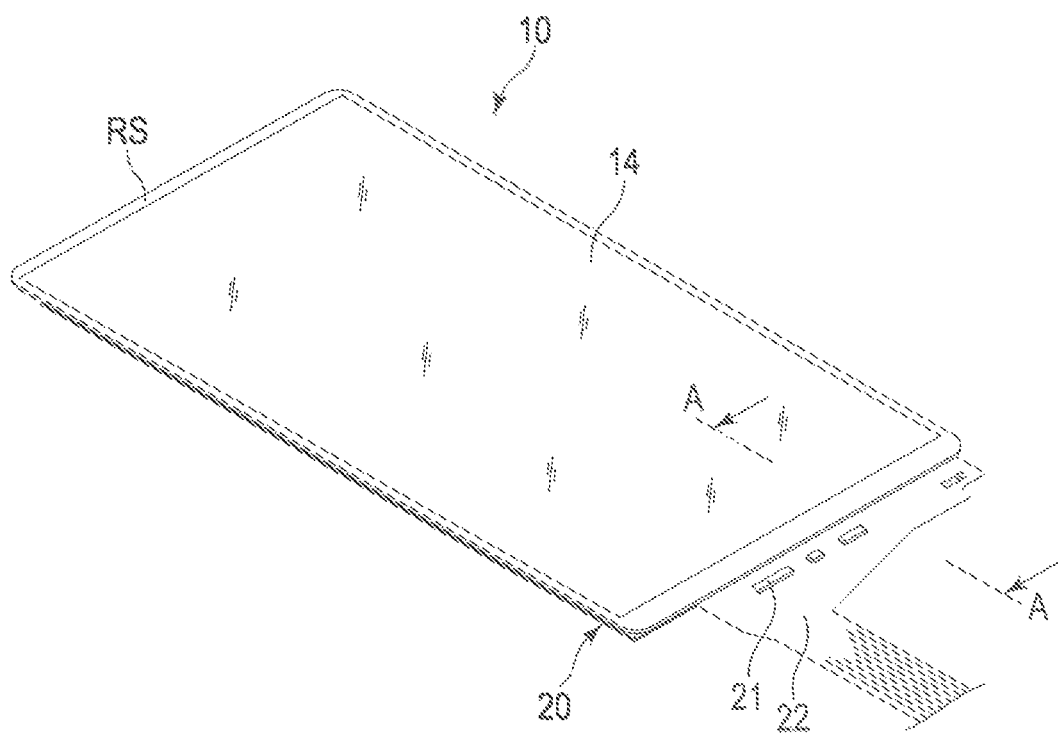
FIG. 1 is a perspective view showing a display surface side of a liquid crystal display device according to an embodiment.

Various embodiments will be described hereinafter with reference to the accompanying drawings. In general, according to one embodiment, a backlight device comprises a case having a bottom plate; a light guide having a first main surface as an emission surface, a second main surface opposed to the first main surface, and an incidence surface provided between the first main surface and the second main surface, the second main surface being arranged on the bottom plate; and a light source unit configured to emit light to the incidence surface and comprising a wiring board with a wiring line and a plurality of light-emitting elements mounted on the wiring board. Each of the light-emitting elements has a mounting surface mounted on the wiring board, a first side surface opposed to the mounting surface, and a light-emitting surface provided between the mounting surface and the first side surface, and each of the light-emitting surfaces faces the incidence surface. Each of the first side surfaces and the second main surface are arranged side by side, and the light source unit is fixed to the light guide with a fixing tape attached over each of the first side surfaces and the second main surface.

The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

Embodiment

Figure 2:
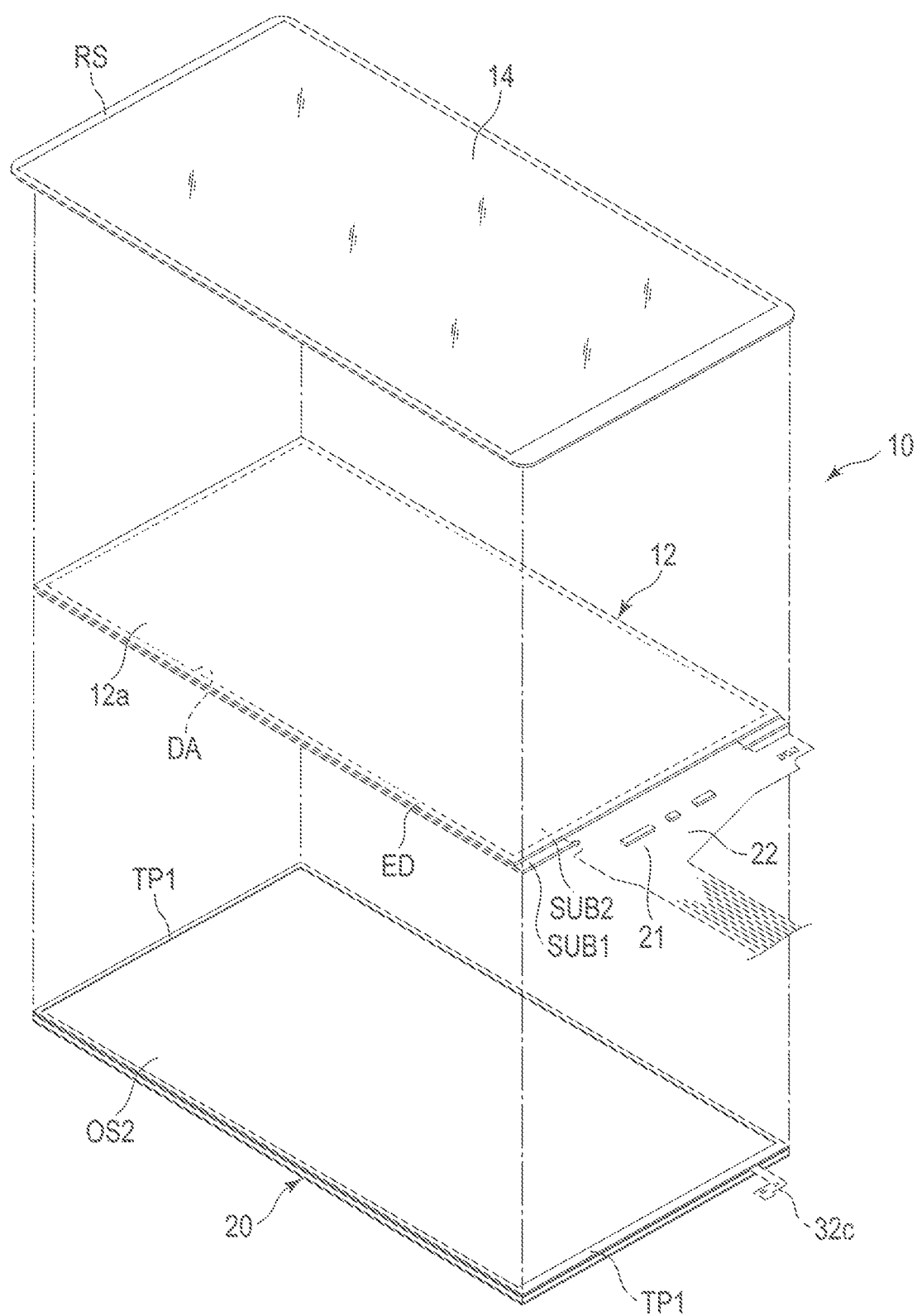
FIG. 2 is an exploded perspective view of the liquid crystal display device.

FIG. 1 is a perspective view showing a display surface side of a liquid crystal display device according to an embodiment, and FIG. 2 is an exploded perspective view of the liquid crystal display device.

A liquid crystal display device 10 can be incorporated into various electronic devices such as a smartphone, a tablet computer, a portable telephone, a notebook computer, a portable game console, an electronic dictionary, a television receiver and an vehicle-navigation system.

As shown in FIGS. 1 and 2, the liquid crystal display device 10 comprises an active-matrix liquid crystal display panel (liquid crystal panel) 12, a cover panel 14 which overlaps a display surface 12a which is one surface of the liquid crystal panel 12 and covers the entire display surface 12a, and a backlight unit (backlight device) 20 opposed to a rear surface of the liquid crystal panel 12 which is the other surface of the liquid crystal panel 12.

Figure 4:
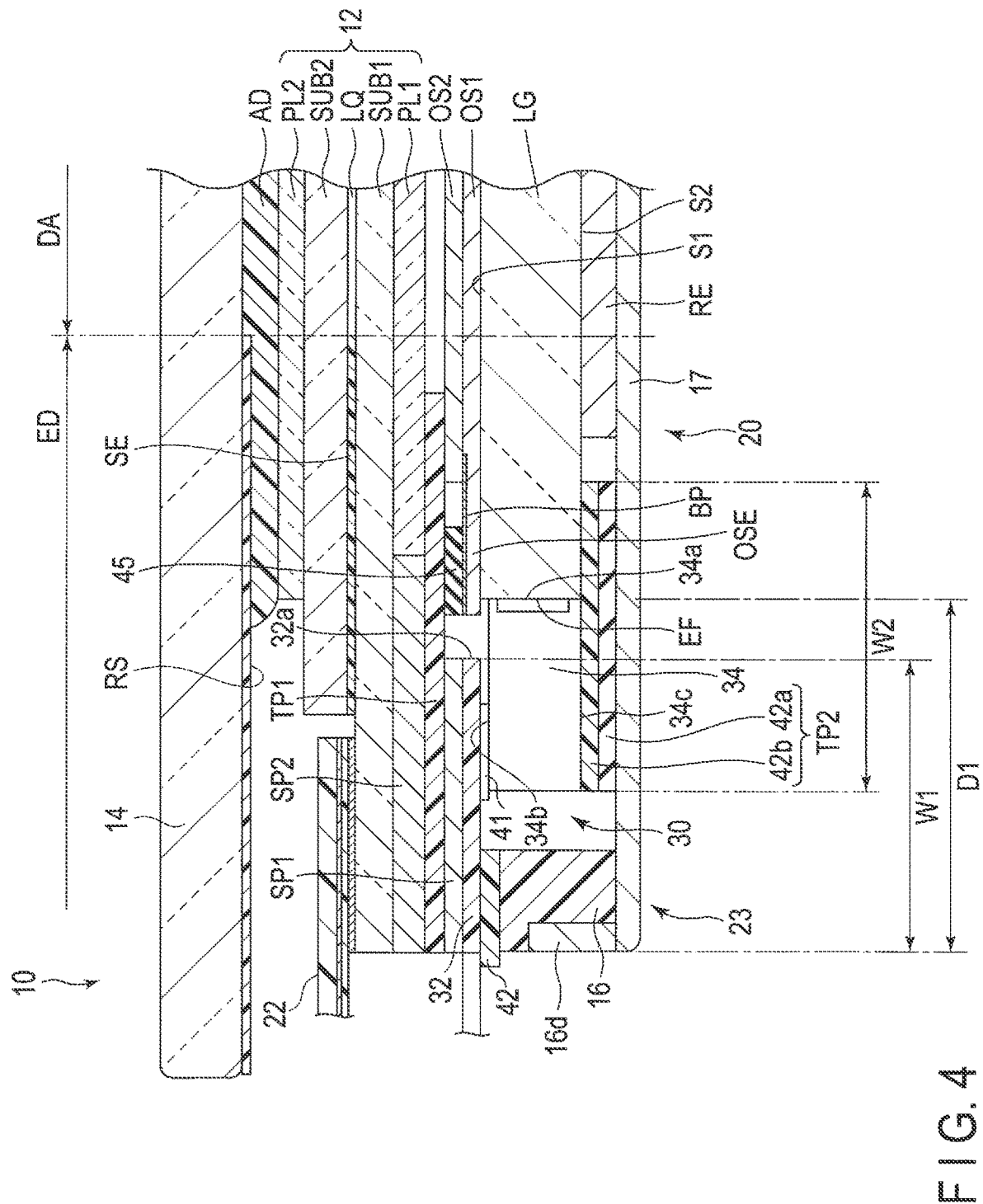
FIG. 4 is a sectional view of a light source side portion of the liquid crystal display device taken along line A-A of FIG. 1.

FIG. 4 is a sectional view of a light source side of the liquid crystal display device taken along line A-A of FIG. 1.

As shown in FIGS. 2 and 4, the liquid crystal panel 12 comprises a first substrate SUB1 which has the shape of a rectangular flat plate, a second substrate SUB2 which has the shape of a rectangular flat plate and faces the first substrate SUB1, and a liquid crystal layer LG sealed between the first substrate SUB1 and the second substrate SUB2. Each of the first substrate SUB1 and the second substrate SUB2 is formed of a transparent insulating substrate such as a glass plate or a resin plate. A peripheral portion of the second substrate SUB2 is attached to the first substrate SUB1 with a sealing member SE. A polarizer PL2 is attached to a surface of the second substrate SUB2, and the display surface 12a of the liquid crystal panel 12 is thereby formed. A polarizer PL1 is attached to a surface of the first substrate SUB1 (rear surface of the liquid crystal panel 12).

On the liquid crystal panel 12, a rectangular display area (active area) DA is provided inside the sealing member SE as the liquid crystal panel 12 is seen in plan view (in other words, when the liquid crystal panel is seen from the normal direction of the display surface). An image is displayed on the display area DA. A rectangular frame area ED is provided around the display area DA. The liquid crystal panel 12 has a transmissive display function which displays an image by selectively transmitting light from the backlight unit 20 to the display area DA.

In the example illustrated, a flexible printed circuit (FPC) 22 is coupled to a short side end portion of the first substrate SUB1 and extends outward from the liquid crystal panel 12. A semiconductor element such as a driver IC chip 21 is mounted on the FPC 22 as a signal supply source which supplies signals necessary for driving the liquid crystal panel 12.

As shown in FIGS. 1, 2 and 4, the cover panel 14 is formed of, for example, a glass plate or acrylic transparent resin and has the shape of a rectangular plate. A frame-shaped light-shielding layer RS is formed on a peripheral portion of a rear surface of the cover panel 14 (a surface on the liquid crystal panel 12 side or a surface opposite to a surface facing the viewer). The light-shielding layer RS may be formed on an upper surface (display surface) of the cover panel 14. The rear surface (rear surface) of the cover panel 14 is attached to the polarizer PL2 of the liquid crystal panel 12 with an adhesive with optical transparency.

Figure 3:
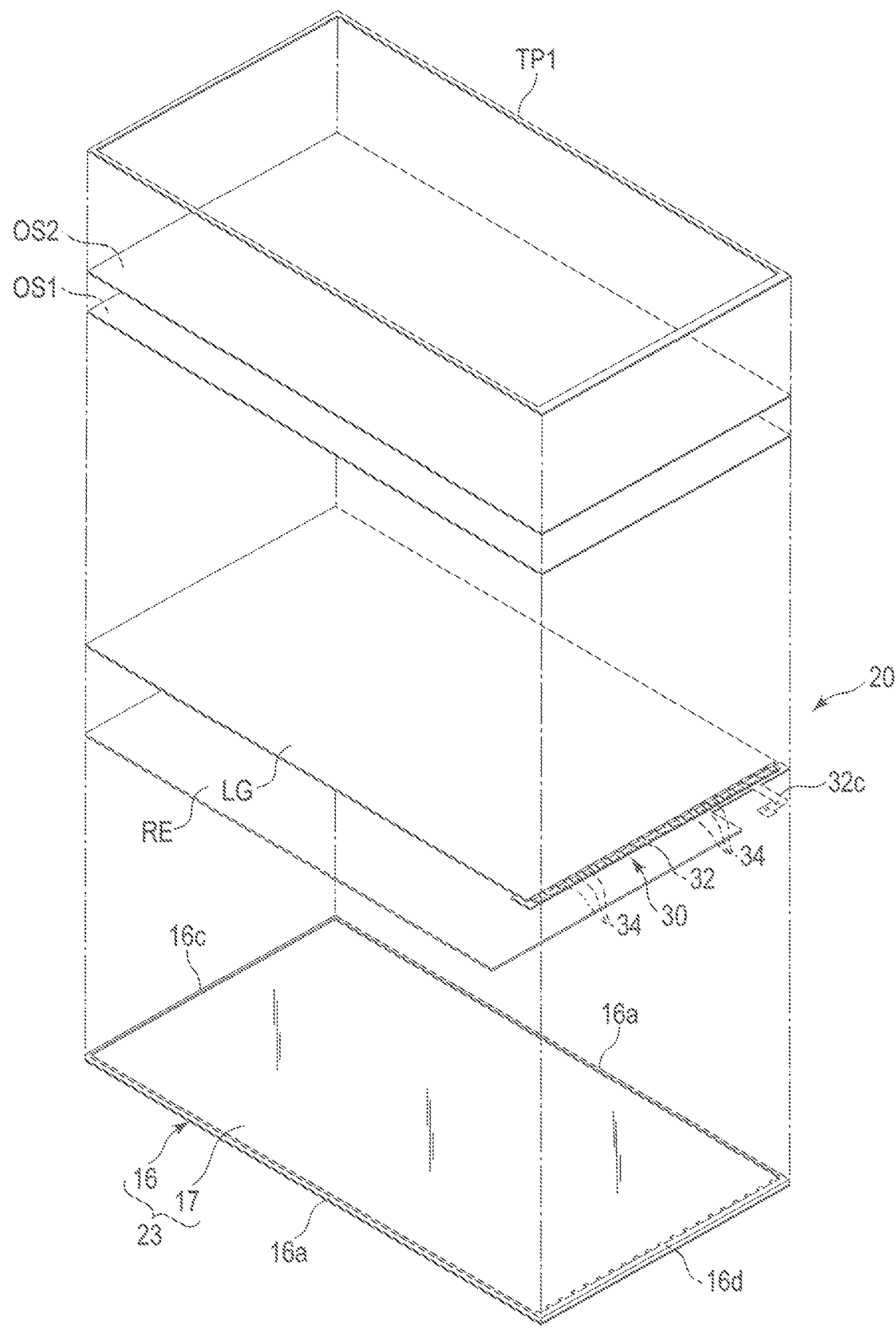
FIG. 3 is an exploded perspective view of a backlight device of the liquid crystal display device.

FIG. 3 is an exploded perspective view of the backlight unit 20. As shown in FIGS. 2, 3 and 4, the backlight unit 20 comprises a case 23, a plurality of optical members arranged in the case 23, and a light source unit 30 which supplies light made incident on the optical members. In the present embodiment, the case 23 comprises a rectangular bottom plate 17, a plurality of side plates which stand along the side edges of the bottom plate 17, and a rectangular frame 16 which is attached firmly to the side plates. The frame 16 and the bottom plate 17 can be integrally formed of resin or metal. Alternatively, one of them can be formed of resin and the other one of them can be formed of metal. In the present embodiment, the bottom plate 17 and the side plates are formed of metal such as stainless steel (SUS), and the frame 16 is formed of resin. The frame 16 is integrally formed with the side plates by insert molding or the like. The frame 16 and the side plates constitute a pair of long side plates 16a and 16b which face each other and a pair of short side plates 16c and 16d which face each other.

The frame 16 is formed in the shape of a frame in the present embodiment, but the frame 16 may be provided only along the pair of short sides of the backlight unit. Alternatively, the frame 16 may be provided only along one of the pair of short sides.

The optical members of the backlight unit 20 comprise a reflective sheet RE which is mounted on the bottom plate 17 inside the frame 16, a light guide LG a plurality of optical sheets, for example, two optical sheets, namely, a first optical sheet OS1 and a second optical sheet OS2 which are overlaid on the light guide LG.

The reflective sheet RE has the shape of a rectangle in a plan view, and dimensions thereof are slightly less than the inner dimensions of the frame 16. The reflective sheet RE is mounted on the bottom plate 17 and covers substantially the entire surface of the bottom plate 17.

The light guide LG is formed of resin having optical transparency such as acrylic or silicon resin in the shape of a rectangular parallelepiped. The light guide LG has a first main surface S1 which is an emission surface, a second main surface S2 which is opposite to the first main surface S1, and a plurality of side surfaces which cross the first and second main surfaces. In the present embodiment, one side surface along one short side of the light guide LG is assumed to be an incidence surface EF.

The light guide plate LG is arranged inside the frame 16 in a state where a second main surface S2 side thereof faces the reflective sheet RE, and is mounted on the reflective sheet RE. The incidence surface EF faces the short side plate 16d of the frame 16 across a space.

According to the present embodiment, a diffusing sheet is used as the first optical sheet OS1, and a prism sheet is used as the second optical sheet OS2. The optical sheets OS1 and OS2 are overlaid in order on the first main surface S1 of the light guide LG The number of optical sheets is not limited to two but may be three or more or two or less.

As shown in FIG. 4, the first optical sheet (diffusing sheet) OS1 has a light source side end portion (short side end portion) OSE. The end portion OSE extends beyond the incidence surface EF of the light guide LG and projects from the light guide LG toward the light source. More specifically, the end portion OSE covers an abutting surface between the incidence surface EF and the LEDs (which will be described later) of the light source unit. A black print BP is formed on an upper surface (surface on the liquid crystal panel 12 side) of the end portion OSE. The black print BP extends throughout the entire length of the short side of the first optical sheet OS1. An area of the first optical sheet which has a black print may be assumed to be the end portion OSE.

Further, a strip-shaped light-shielding tape 45 is attached so as to overlap the black print BP. The end portion OSE is light-shielded and light leakage from the end portion OSE is prevented by the black print BP and the light-shielding tape 45. In the present embodiment, the width of the light-shielding tape 45 is less than the width of the black print BP (that is, the width of the end portion OSE). Alternatively, the width of the light-shielding tape 45 may be greater than the width of the black print BP. Further, an end portion of the light-shielding tape 45 may project outward from the first optical sheet OS1.

Figure 5:
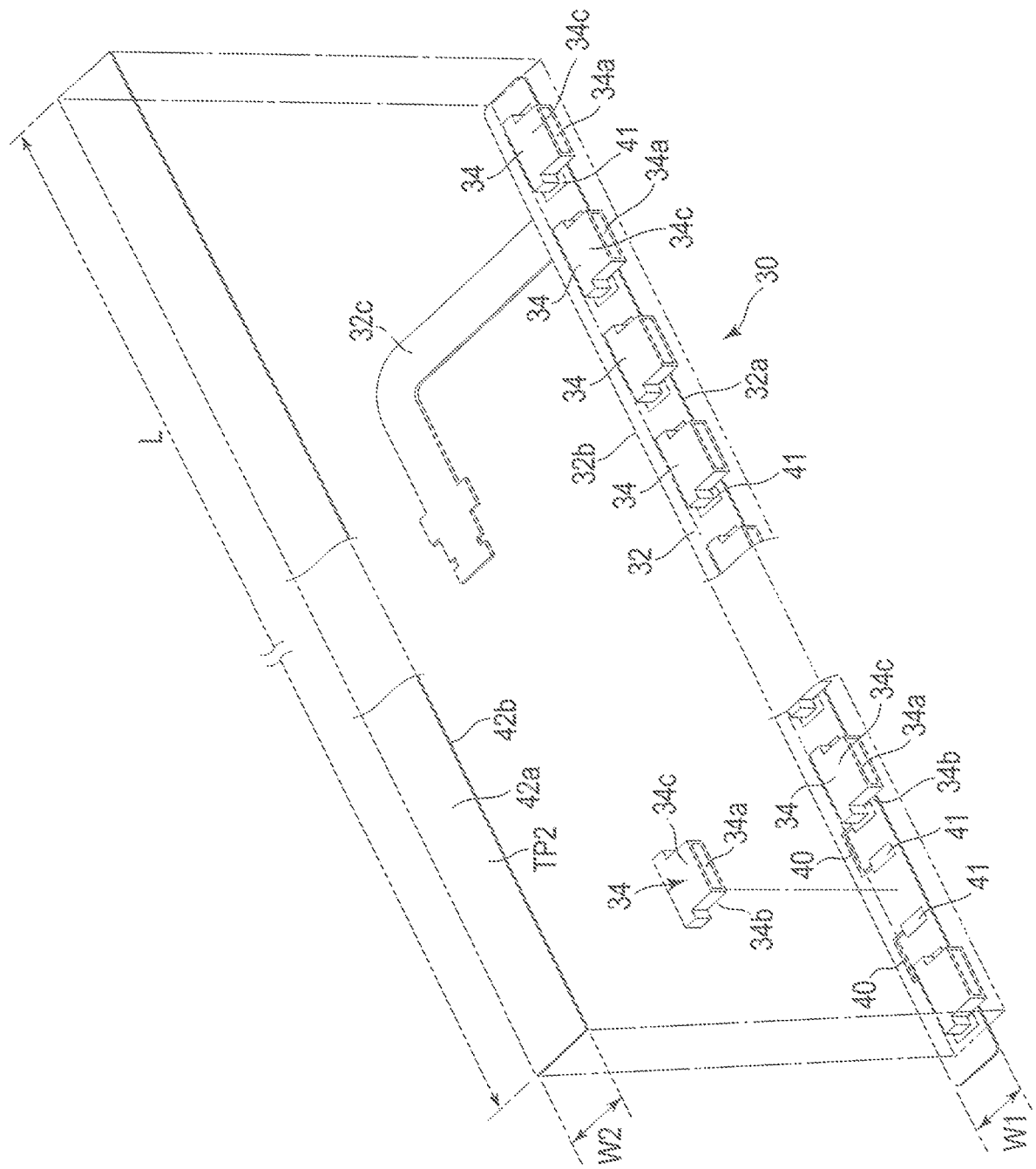
FIG. 5 is a perspective view showing a light source unit of the backlight device.

Next, the light source unit (light source device) 30 of the backlight unit 20 will be described in detail. FIG. 5 is a perspective view of an LED mounting side of the light source unit.

As shown in FIG. 5, the light source unit 30 comprises a strip-shaped flexible printed circuit board (FPC) 32 which functions as a wiring board, and a plurality of light sources which are mounted on the FPC 32. The FPC 32 has substantially the same length as that of the short sides of the case 23 and has a pair of side edges 32a and 32b which extend parallel to each other. The FPC 32 has a connecting end portion 32c which is integrally formed and extends from one side edge 32b. The FPC 32 comprises a plurality of connecting pads 41 and a plurality of wiring lines 40 which are formed of a conductive layer, and the connecting pads 41 are exposed at one surface of the FPC 32. A width W1 of the FPC 32 is less than a distance D1 (see FIG. 4) between the incidence surface EF of the light guide LG and an outer surface of the short side plate 16d.

In the present embodiment, as the light sources, a plurality of light-emitting elements which are point light sources, for example, a plurality of light-emitting diodes (LEDs) 34 are arranged at predetermined intervals. Each of the LEDs 34 comprises a case (enclosure) having substantially the shape of a rectangular parallelepiped. The case has a mounting surface 34b, a first side surface 34c opposed to the mounting surface 34b, and a light-emitting surface 34a which emits light provided between the mounting surface 34b and the first surface 34c. A pair of connecting terminals (not shown) are provided on the mounting surface 34b.

Mounting surface 34b sides of the LEDs 34 are mounted on one surface of the FPC 32. More specifically, the pair of connecting terminals of the LED 34 are electrically and mechanically coupled to the connecting pads 41 of the FPC 32. The LED 34 is mounted on the FPC 32 such that an end portion thereof including the light-emitting surface 34a projects outward from the side edge 32a of the FPC 32. The light-emitting surface 34a is separated from the side edge 32a and is substantially parallel to the side edge 32a.

The LEDs 34 are arranged at predetermined intervals in a longitudinal direction of the FPC 32 (a direction parallel to the side edges 32a and 32b or a direction parallel to the short side plate 16d of the frame 16). The light-emitting surfaces 34a of the LEDs 34 are substantially flush with one another along the side edge 32a. The arrangement pitch of the LEDs 34 or the distance between two adjacent LEDs 34 can be appropriately determined. As described above, the width W1 of the FPC 32 is reduced as much as possible, and as a result, the light-emitting surfaces 34a of the LEDs 34 project from the FPC 32. The width W1 of the FPC 32 should preferably be about 1 to 1.5 times a depth from the light-emitting surfaces 34a of the LEDs 34.

The light source unit 30 constituted as described above is arranged in the case 23 and is fixed to and supported on the light guide LG with a fixing tape TP2.

As shown in FIG. 4, the light source unit 30 is arranged in the case 23. That is, the LEDs 34 are arranged between the incidence surface EF of the light guide LG and the short side plate 16d inside the case 23, and the light-emitting surfaces 34a of the LEDs 34 face the incidence surface EP across a small space in parallel or abut the incidence surface EF in parallel. The FPC 32 is arranged along the short side plate 16d, and a side edge portion thereof on the side edge 32b side is mounted on the short side plate 16d. The FPC 32 is located in substantially the same plane as the first optical sheet OS1 and faces the bottom plate 17 across the LEDs 34. The side edge 32a of the FPC 32 is separated from the incidence surface EF toward the short side plate 16d and faces the end portion OSE of the first optical sheet OS1 across a space. The side edge portion of the FPC 32 may be attached to the frame 16 with an adhesive (adhesive tape) 42.

The first side surfaces 34c of the LEDs 34 are substantially flush with the second main surface S2 of the light guide LG The fixing tape TP2 is attached over the first side surfaces 34c and the second main surface S2 of the light guide LG The LEDs 34 are fixed to the light guide LG with the fixing tape TP2 and are supported on predetermined positions. The fixing tape TP2 comprises a strip-shaped base 42a formed of, for example, polyethylene terephthalate (PET) or the like and a strip-shaped adhesive sheet 42b overlaid on the base 42a. For example, a thermally reactive adhesive sheet formed of polyurethane or the like is used as the adhesive sheet 42b. When heated to about 70° C. to 120° C., the adhesive sheet 42b produces an adhesion force by reaction with the attached objects. The thermally reactive adhesive sheet 42b can produce an adhesion force which is about 3 to 5 times the adhesion force of a general double-faced adhesive tape. The adhesive sheet 42b may be transparent or the adhesive sheet 42b may be black with black ink, etc., and have a light-shielding function.

The fixing tape TP2 is provided from the LEDs 34 to the light guide LG and is intended for fixing them in a state where they abut each other, and the fixing tape TP2 is not attached to the bottom plate 17.

The fixing tape TP2 has a width W2 which is greater than the width of the LEDs 34 and has a length L (see FIG. 5) which is substantially the same as the length of the short sides of the light guide LG The fixing tape TP2 is arranged along a short side of the light guide LG and substantially half of the area of the adhesive sheet 42b in a width direction is attached to the first side surfaces 34c of the LEDs 34. The remaining area of the adhesive sheet 42b is attached to the second main surface S2 of the light guide LG.

As described above, since the adhesive sheet 42b produces a strong adhesion force, even if the adhesive sheet 42b is attached to a relatively small attachment area, the adhesive sheet 42b can still be firmly attached to the area. Therefore, the LEDs 34 can be firmly fixed to the light guide LG and can be stably supported on predetermined positions by the fixing tape TP2. The above-described thermally reactive adhesive sheet may be used as an adhesive which attaches the previously-described FPC 32 to the short side plate 16d.

As shown in FIGS. 2 and 3, the backlight unit 20 comprises a frame-shaped double-faced adhesive tape TP1. The double-faced adhesive tape TP1 is attached to the frame 16.

As shown in FIG. 4, in a light source side end portion of the case 23, the double-faced adhesive tape TP1 is attached to the FPC 32 via a spacer SP1 and is further attached to the light-shielding tape 45.

The backlight unit 20 constituted as described above is attached to the liquid crystal panel 12 with the double-faced adhesive tape TP1. An inner peripheral portion of the double-faced adhesive tape TP1 is attached to the polarizer PL1, and an outer peripheral portion of the double-faced adhesive tape TP1 is attached to the first substrate SUB1 via a spacer SP2. The outer peripheral edges of the backlight unit 20 match the outer peripheral edges of the first substrate SUB1.

The FPC 32 of the light source unit 30 is connected to the FPC 22 via the connecting terminal 32c (see FIGS. 1 and 2). When a drive current is supplied to the LEDs 34 via the FPC 22 and the FPC 32, the LEDs 34 are lit up. The light emitted from the LEDs 34 enters the light guide LG from the incidence surface EF, propagates through the light guide LG or is reflected off the reflective sheet RE, and is emitted from the first main surface (emission surface) S1 to the liquid crystal panel 12 side.

According to the backlight unit 20 and the liquid crystal display device 10 of the present embodiment constituted as described above, the LEDs 34 of the light source unit 30 are firmly fixed to the light guide LG and are supported on predetermined positions by the fixing tape TP2. Therefore, the FPC (wiring board) 32 of the light source unit 30 does not have to have the function of supporting and fixing the light source unit 30, and the width W1 of the FPC 32 can be considerably reduced. When the width W1 of the FPC 32 is reduced, the distance between the short side plate 16d of the case 23 and the incidence surface EF of the light guide LG can be reduced. As a result, the frame width on the light source side of the backlight unit 20 and the frame width on the light source side of the liquid crystal display device 10 can be reduced, and the frame can be narrowed, accordingly.

The FPC 32 does not overlap the light guide LG and is separated from the incidence surface EF. Therefore, the thickness of the backlight unit 20 can be reduced.

Further, when viewed from the incidence surface EP side, the side edge 32a of the FPC 32 is drawn back from the light-emitting surfaces 34a of the LEDs 34, and therefore the light from the light-emitting surfaces 34a of the LEDs 34 may leak upward. Regarding this, in the present embodiment, the first optical sheet (diffusing sheet) OS1 has the light source side end portion OSE, and the light source side end portion OSE extends from the light guide LG beyond the incidence surface EF and covers the incidence surface EF and the light-emitting surfaces 34a of the LEDs 34. The black print BP and the light-shielding tape 45 are provided on the light source side end portion OSE, and a light-shielding function is thereby given to the light source side end portion OSE. Therefore, the gap between the FPC 32 and the incidence surface EF can be light-shielded by the light source side end portion OSE of the first optical sheet OS1, and light leakage from the LEDs 34 can be prevented, accordingly.

As described above, in a conventional structure, a wiring board (FPC) of a light source unit not only has the function of fixing and electrically connecting LEDs but also has the function of blocking light from LEDs and the function of fixing LEDs in the state of abutting a light guide. On the other hand, in the present embodiment, the function of the FPC 32 is limited to the function of supplying current to the LEDs 34, and the light-shielding function is given to the optical sheet OS1 and the fixing function is given to the fixing tape TP2. More specifically, the light-shielding function is given to the optical sheet OS1 by projecting the optical sheet OS1 from the light guide LG and forming a light-shielding area. Further, the fixing function is given to the fixing tape TP2 alone by providing the fixing tape TP2 on the opposite side of the LEDs 34 to the FPC 32 and using an highly-adhesive adhesive sheet as the light-shielding tape TP2. As a result, the size of the FPC 32 can be considerably reduced, and the frame on the light source side of the liquid crystal display panel can be narrowed.

As described above, according to the present embodiment, a backlight device and a liquid crystal display device which can achieve narrowing of a frame and reduction of a thickness can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All structures which can be implemented by a person of ordinary skill in the art through arbitrary design changes based on the structures described above as the embodiment of the present invention come within the scope of the present invention as long as they encompass the spirit of the present invention. For example, the outer shape and inner shape of each of the liquid crystal panel, components of the backlight unit and the case are not limited to a rectangle, but one or both of the outer shape and inner shape may be a polygon, a circle, an ellipse or other shape such as a combination thereof in a plan view. The liquid crystal display device and the backlight device are not necessarily flat but may be partially or entirely curved or inclined. The materials of components are not limited to those described above but can be selected from various other materials.

Regarding advantages other than those described in the embodiment, advantages obvious from the description and advantages appropriately conceivable by a person of ordinary skill in the art are regarded as advantages achievable from the present invention as a matter of course.

What is claimed is:

1. A backlight device comprising:
   a case having a bottom plate;
   a light guide including a front surface as an emission surface, a rear surface opposed to the front surface, and an incidence surface provided between the front surface and the rear surface, the rear surface being arranged on the bottom plate; and
   a plurality of light-emitting elements facing the incident surface of the light guide, wherein
   each of the light-emitting elements includes a first surface provided at a bottom of each of the light-emitting elements, and a light-emitting surface facing the incidence surface of the light guide,
   each of the first surfaces and the rear surface are arranged side by side, and fixed to a fixing tape attached over each of the first surfaces and the rear surface of the light guide, and
   a light-shield is facing the fixing tape through the light guide.

2. The backlight device of claim 1, wherein
   the fixing tape is attached to entire areas of the first surface of each of the light-emitting elements and an edge portion of the rear surface close to the incidence surface of the light guide.

3. The backlight device of claim 1, further comprising an optical sheet on the front surface of the light guide, wherein
   the optical sheet has a light source side end portion extending toward the light-emitting elements and facing the light-emitting elements.

4. The backlight device of claim 3, wherein the light shield is formed on the light source side end portion.

5. The backlight device of claim 1, further comprising:
   a wiring board with a wiring line, the plurality of light-emitting elements being mounted on the wiring board.

6. The backlight device of claim 5, wherein
   the wiring board faces the bottom plate through the light-emitting elements,
   the wiring board has a side edge located above the light-emitting elements, and
   a part of each of the light-emitting elements is overlapping the wiring board, and the light-emitting surface of each light-emitting element is located at a position projecting from the side edge toward the light guide.

7. The backlight device of claim 5, wherein
   the case includes a side plate which stands along a side edge of the bottom plate and faces the light-emitting elements with a gap, and
   a part of the wiring board is attached to the side plate with an adhesive.

8. The backlight device of claim 1, wherein
the light-shield is located above the incidence surface of the of the light guide and the light-emitting surface of each of the light-emitting elements.

9. A liquid crystal display device comprising:
a liquid crystal panel; and
the backlight device of claim 1 which faces the liquid crystal panel.

10. A backlight device comprising:
a case having a bottom plate;
a light guide including a front surface as an emission surface, a rear surface opposed to the front surface, and an incidence surface provided between the front surface and the rear surface, the rear surface being arranged on the bottom plate; and
a plurality of light-emitting elements facing the incident surface of the light guide, wherein
each of the light-emitting elements includes a first surface provided at a bottom of each of the light-emitting elements, and a light-emitting surface facing the incidence surface of the light guide,
each of the first surfaces and the rear surface are arranged side by side, and fixed to a fixing tape attached over each of the first surfaces and the rear surface of the light guide, and
a light-shield is facing the fixing tape through each of the light emitting elements.

11. The backlight device of claim 10, wherein
the fixing tape is attached to entire areas of the first surface of each of the light-emitting elements and an edge portion of the rear surface close to the incidence surface of the light guide.

12. The backlight device of claim 10, further comprising an optical sheet on the front surface of the light guide, wherein
the optical sheet has a light source side end portion extending toward the light-emitting elements and facing the light-emitting elements.

13. The backlight device of claim 10, further comprising:
a wiring board with a wiring line, the plurality of light-emitting elements being mounted on the wiring board.

14. The backlight device of claim 13, wherein
the wiring board faces the bottom plate through the light-emitting elements,
the wiring board has a side edge located above the light-emitting elements, and
a part of each of the light-emitting elements is overlapping the wiring board, and the light-emitting surface of each light-emitting element is located at a position projecting from the side edge toward the light guide.

15. The backlight device of claim 14, wherein
the case includes a side plate which stands along a side edge of the bottom plate and faces the light-emitting elements with a gap, and
a part of the wiring board is attached to the side plate with an adhesive.

16. A liquid crystal display device comprising:
a liquid crystal panel; and
the backlight device of claim 10 which faces the liquid crystal panel.

* * * * *